(12) United States Patent
Goel et al.

(10) Patent No.: US 11,785,282 B1
(45) Date of Patent: Oct. 10, 2023

(54) WEB-HOSTED VIDEO RECORDING AND ASSOCIATED SYSTEMS AND METHODS

(71) Applicant: Loom, Inc., San Francisco, CA (US)

(72) Inventors: Harshyt Goel, San Francisco, CA (US); Brendon John Muschamp, Christchurch (NZ); Jae Eun Lee, Astoria, NY (US); Justin Reidy, Charlotte, VT (US)

(73) Assignee: Loom, Inc., San Francisco, CA (US)

( * ) Notice: Subject to any disclaimer, the term of this patent is extended or adjusted under 35 U.S.C. 154(b) by 0 days.

(21) Appl. No.: 18/085,389

(22) Filed: Dec. 20, 2022

Related U.S. Application Data

(60) Provisional application No. 63/339,427, filed on May 7, 2022.

(51) Int. Cl.
  *H04N 21/433* (2011.01)
  *H04N 21/266* (2011.01)
  *H04N 21/254* (2011.01)

(52) U.S. Cl.
  CPC ..... *H04N 21/4334* (2013.01); *H04N 21/2541* (2013.01); *H04N 21/26613* (2013.01)

(58) Field of Classification Search
  CPC ........... H04N 21/4334; H04N 21/2541; H04N 21/26613
  See application file for complete search history.

(56) References Cited

U.S. PATENT DOCUMENTS

| | | | |
|---|---|---|---|
| 9,083,997 B2 * | 7/2015 | Harwell | ............. H04N 21/2408 |
| 10,484,505 B2 | 11/2019 | Kridlo | |
| 10,891,395 B2 | 1/2021 | Yu | |
| 11,190,828 B1 * | 11/2021 | Gratton | .................. G11B 27/34 |
| 2012/0039580 A1 * | 2/2012 | Sweatt, III | ......... H04N 21/4622 |
| | | | 386/230 |
| 2013/0083210 A1 | 4/2013 | Beckham et al. | |

(Continued)

OTHER PUBLICATIONS

Apowersoft, "Free Online Screen Recorder", pp. 1-4, Accessed Sep. 19, 2022. Available at: https://www.apowersoft.com/free-online-screen-recorder.

(Continued)

*Primary Examiner* — Mishawn N. Hunter
(74) *Attorney, Agent, or Firm* — American Patent Agency PC; Daniar Hussain; Stephen M. Hou

(57) ABSTRACT

Systems and methods for loginless video recording from a third-party website viewed on a user device are provided. The present invention enables users to record a video while browsing a third-party website without the need for installing recording software or logging into a recording service, thus paving the way to anonymous online recording and messaging. In one embodiment, the method, executable by a recording server, includes receiving a signed token associated with a user access request to a third-party server; receiving from the user device an iframe request including the signed token, in response to a user recording request; verifying a signature of the signed token; transmitting to the user device code for generating an iframe for display on the third-party website at the user device; receiving from the iframe a session validation request; generating a recording session; and receiving from the iframe a recording action request.

20 Claims, 13 Drawing Sheets

(56) References Cited

U.S. PATENT DOCUMENTS

2015/0127727 A1* 5/2015 Tseng .................... H04L 67/53
709/204

OTHER PUBLICATIONS

FlexClip, "Free Online Screen Recorder", pp. 1-5, Accessed Sep. 19, 2022. Available at: https://www.flexclip.com/tools/screen-recorder/.
RecordCast, "Give Wings to Screen Recording and Video Editing", pp. 1-4, Accessed Sep. 19, 2022. Available at: https://www.recordcast.com/.
Itself tools, "Screen Recorder", pp. 1-3, Accessed Sep. 19, 2022. Available at: https://online-screen-recorder.com/.
Veed.Io, "Pick a Layout for Recording" pp. 1, Accessed Sep. 19, 2022. Available at: https://www.veed.io/screen-recorder-app?locale=en&source=/tools/screen-recorder.
Screen Capture, "Free Online Screen Recorder", pp. 1-2, Accessed Sep. 19, 2022. Available at: https://www.screencapture.com/.

* cited by examiner

WEB-HOSTED VIDEO RECORDING AND ASSOCIATED SYSTEMS AND METHODS

REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications are also incorporated by reference, including any priority claims made in those applications and any material incorporated by reference, to the extent such subject matter is not inconsistent herewith.

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

FIELD OF THE INVENTION

Embodiments of the invention are in the field of video recording, and pertain particularly to methods and systems for loginless video recording from a third-party website viewed on a user device.

BACKGROUND OF THE INVENTION

The statements in the background of the invention are provided to assist with understanding the invention and its applications and uses, and may not constitute prior art.

Given the tremendous growth of social networking and remote applications, video has become crucial in everyday communication. Various methods for recording and sharing videos have emerged over time to provide the best quality experience to users. Recording and sharing videos asynchronously has proven to be a powerful feature that offers multiple advantages and has numerous potential applications.

Nonetheless, the process of recording and sharing videos while using any online service can be challenging. Video recording and sharing of video messages on a website or an application requires the presence of proper infrastructure for recording a video on the website. Some websites use a third-party video application for providing video recording services. The user of the website typically needs to install a video recorder and create an account to log into the video services provided by the third-party application. This creates a burden on the user, given that more and more users expect a fast and trouble-free experience of using websites and applications.

Some websites may provide video recording services without the requirement of downloading a video recording application. However, access to video recording services usually still requires the user to create a video recording account and to log into that account. The offered video service is thus neither loginless nor anonymous.

Therefore, there is a need for a system that allows users to seamlessly record and share video messages without installing new software on their devices or providing the video recording service with login information.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

The present invention provides asynchronous video sharing and messaging functionalities with audio-, video-, screen-, and window-recording capabilities to the user of a third-party website, without requiring the user to install video recording software or to login to an online video service. The methods and systems described herein enable loginless web-hosted video, audio, and multimedia recording, and include necessary steps for user anonymity.

Various methods and algorithms for loginless video recording from a third-party website viewed on a user device are within the scope of the present invention. In one embodiment, the method includes receiving, from the user device, an iframe request in response to a user recording request on the third-party website, where the third-party website is hosted on a third-party server and enables a user to initiate a recording on the user device, where the iframe request includes a signed token associated with a user access request to the third-party server, and where the signed token was received by the user device from the third-party server; verifying a signature of the signed token using public key cryptography, where the verifying includes obtaining a key associated with the third-party server from a recording database; transmitting iframe recorder interface code to the user device, in response to the verifying of the signature of the received token, where the iframe recorder interface code includes program code for generating an iframe for display on the third-party website at the user device; receiving a session validation request from the iframe on the user device; generating a recording session in response to receiving the session validation request, where generating the recording session includes validating the recording session and transmitting a validation response to the iframe, and where validating the recording session includes associating the recording session with the third-party server; and receiving, from the iframe on the user device, a recording action request, in response to receiving a recording action to control a recording on the user device.

In one embodiment, the iframe recorder interface code generates a video recorder interface for viewing on the third-party website on the user device. In another embodiment, the method further includes generating a video recording in response to receiving the recording action request. In yet another embodiment, the method further includes generating a link to a completed recording; and transmitting the link to the third-party website for display on the user device.

In one embodiment, the signed token is encrypted using a key that is known only to the recording server. In another embodiment, the signed token includes a user session ID and a token validity time. In yet another embodiment, the recording action is selected from the group consisting of a starting, a stopping, a previewing, an editing, and a canceling of the recording.

In one embodiment, the recording server is configured for creating a third-party session associated with a guest account upon receiving the iframe request from the user device. In another embodiment, the method further includes generating a recording upon execution of a starting of the recording, where the guest account is activated by the execution of the starting of the recording, and where the guest account owns the recording. In yet another embodiment, the method further includes generating a link to a completed recording upon execution of a stopping of the recording, where the guest account is deactivated by the execution of the stopping of the recording.

In various embodiments, a computer program product is disclosed. The computer program may be used for loginless web-hosted video recording, and may include a computer-readable storage medium having program instructions, or program code, embodied therewith, the program instructions executable by a processor to cause the processor to perform the aforementioned steps.

In various further embodiments, a system is described, including a memory that stores computer-executable components, and a hardware processor, operably coupled to the memory, that executes the computer-executable components stored in the memory, where the computer-executable components may include components communicatively coupled with the processor that execute the aforementioned steps.

In other embodiments, the present invention is a non-transitory, computer-readable storage medium storing executable instructions, which when executed by a processor, causes the processor to perform a process for loginless web-hosted video recording, the instructions causing the processor to perform the aforementioned steps.

In another embodiment, the present invention is a computerized server including at least one processor, one memory, and a plurality of computer codes embodied on said memory, said plurality of computer codes, when executed, causing said processor to execute a process including the aforementioned steps. Other aspects and embodiments of the present invention include the methods, processes, and algorithms including the steps described herein, and also include the processes and modes of operation of the systems and servers described herein.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Nor are all drawings corresponding to specific steps or embodiments of the present invention drawn to scale. Emphasis is instead placed on illustrating the nature, function, and product of the methods and devices described herein.

Embodiments of the present invention described herein are exemplary and not restrictive. Embodiments will now be described, by way of examples, with reference to the accompanying drawings, in which.

DETAILED DESCRIPTION OF THE INVENTION

In the following description, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Embodiments of the present invention provide a system and method for loginless video recording from a third-party website viewed on a user device. In one embodiment, the user of a third-party webpage of the third-party website is enabled to exchange video messages with other users of the third-party webpage. In another embodiment, the user of the third-party webpage is enabled to exchange video messages with individuals outside of the third-party webpage. One object of the present invention is to enable a user to record a video while browsing a third-party webpage without the need for installing a video recording application, creating an account, or logging into a video recording online service. Another object of the present invention is to provide loginless and anonymous video messaging from a third-party website viewed on a user device. The present invention provides asynchronous video sharing and messaging functionalities with audio-, video-, screen-, and window-recording capabilities to users of the third-party website or a third-party application. The present invention applies equally to both third-party websites running on browser applications on a user device, and third-party software applications operating independently from browsers on the user device.

Web-Hosted Video Recording

Figure 1:
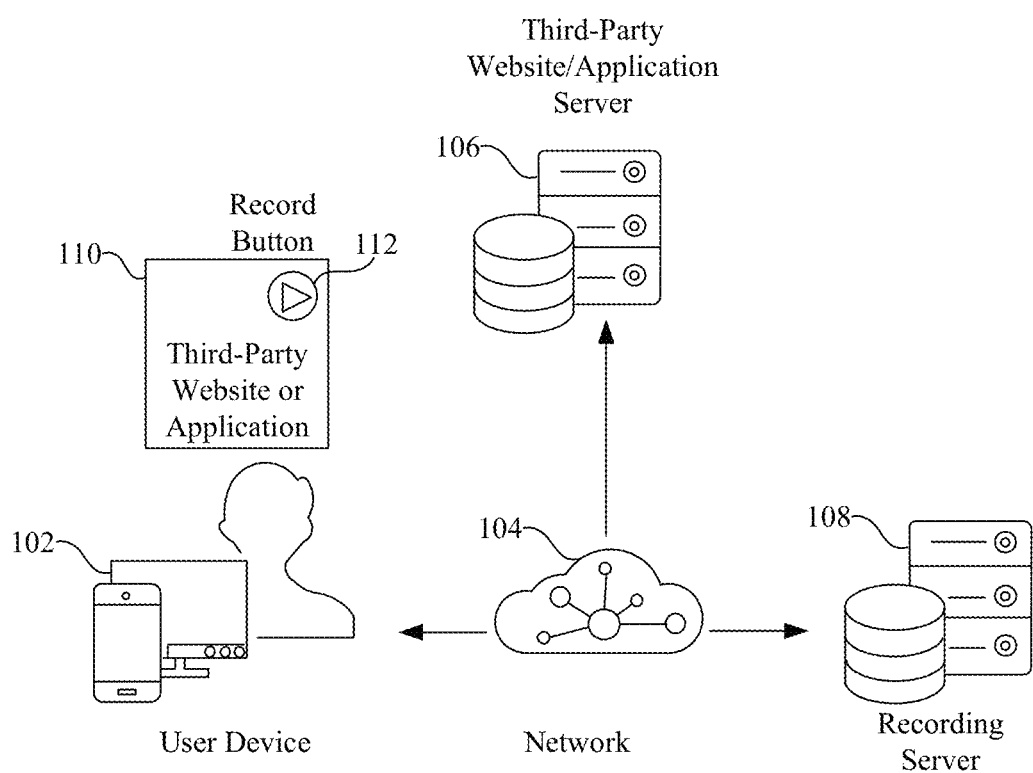
FIG. 1 illustrates a block diagram of a system for loginless video recording from a third-party website on a user device, in accordance with an exemplary embodiment of the present invention.

FIG. 1 illustrates a block diagram of a system for loginless video recording from a third-party website or application (110) viewed on a user device (102), according to an exemplary embodiment of the present invention. The system includes the user device (102), the third-party website or application (110), a third-party website/application server (106), and a recording server (108). A user is enabled to access the third-party website/application (110) using the user device (102) via a network (104) such as the Internet, where the third-party website (110) offers the user the ability to record video, audio, and/or multimedia, usually as part of the service provided by the third-party website/application. The user device (102) is at least one of, but not limited to, the following: a smart phone, a camera, a tablet, a laptop, a personal digital assistant (PDA), and a desktop. For simplicity, the third-party website or application (110) is hereinafter referred to as the third-party website, and the third-party website/application server (106) is hereinafter referred to as the third-party server.

The third-party website (110) includes a recording interface such as a record button (112), or a "start recording session" button, where recording operations are provided by the recording server (108) through an iframe. The record button (112) enables the user to record video, audio, and multimedia inside the third-party website (110) without installing any recording software or logging into the recording service provided by the recording server (108) on the third-party website (110). Furthermore, the third-party website (110) may enable the user to share the recording (e.g., a recorded video) with other users on the third-party website (110). The definition and operation of iframes are described in the context of FIG. 5 in the section "Architecture and Process for Loginless Web-Hosted Video Recording," whereas loginlessness and anonymity are discussed in the next section, titled "Loginlessness and Anonymity in Third-party Services."

The third-party website or application is any website or application providing a service to the user. In various embodiments, the third-party website or application (110) is any website or application providing telepresence capabilities to the user. In an exemplary embodiment, the third-party website (110) can be a fitness website, an educational website, a workplace website, or any other website providing an interactive or an individual service to the user. For example, the third-party website (110) may be a fitness website allowing the recording and sharing of workout routine videos between trainers and clients. In another embodiment, the third-party website is an educational website allowing loginless and anonymous video-, audio-, image-, or text-based interaction between students and teachers. In another embodiment, the third-party website (110) is a health services website providing interactions between medical professionals and patients. In some embodiments, the third-party website is a website allowing video messaging (e.g., video explanations of screen content/actions, video feedback) between customers and providers in any area of retail, medicine, technology, research, education, and industry.

In some embodiments, the third-party website/application (110) allows an experience or a process from within the website/application to be recorded and transmitted (e.g., via a video file or a link thereto) to any public inside or outside of the third-party website user base. In some embodiments, the third-party website (110) may set limitations on the sharing of the video recording and/or link.

In one embodiment, the network (104) may be the Internet or any wide-area, metro-area, or local-area network. In some embodiments, the network may include wireless communication links, such as shortwave, microwave, high frequency, wireless fidelity (Wi-Fi), Bluetooth technology, global system for mobile communications (GSM), code division multiple access (CDMA), second-generation (2G), third-generation (3G), fourth-generation (4G), 4G long term evolution (LTE), LTE Advanced, and any other wireless communication technology or standard to establish wireless communication for exchanging data.

Figure 5:
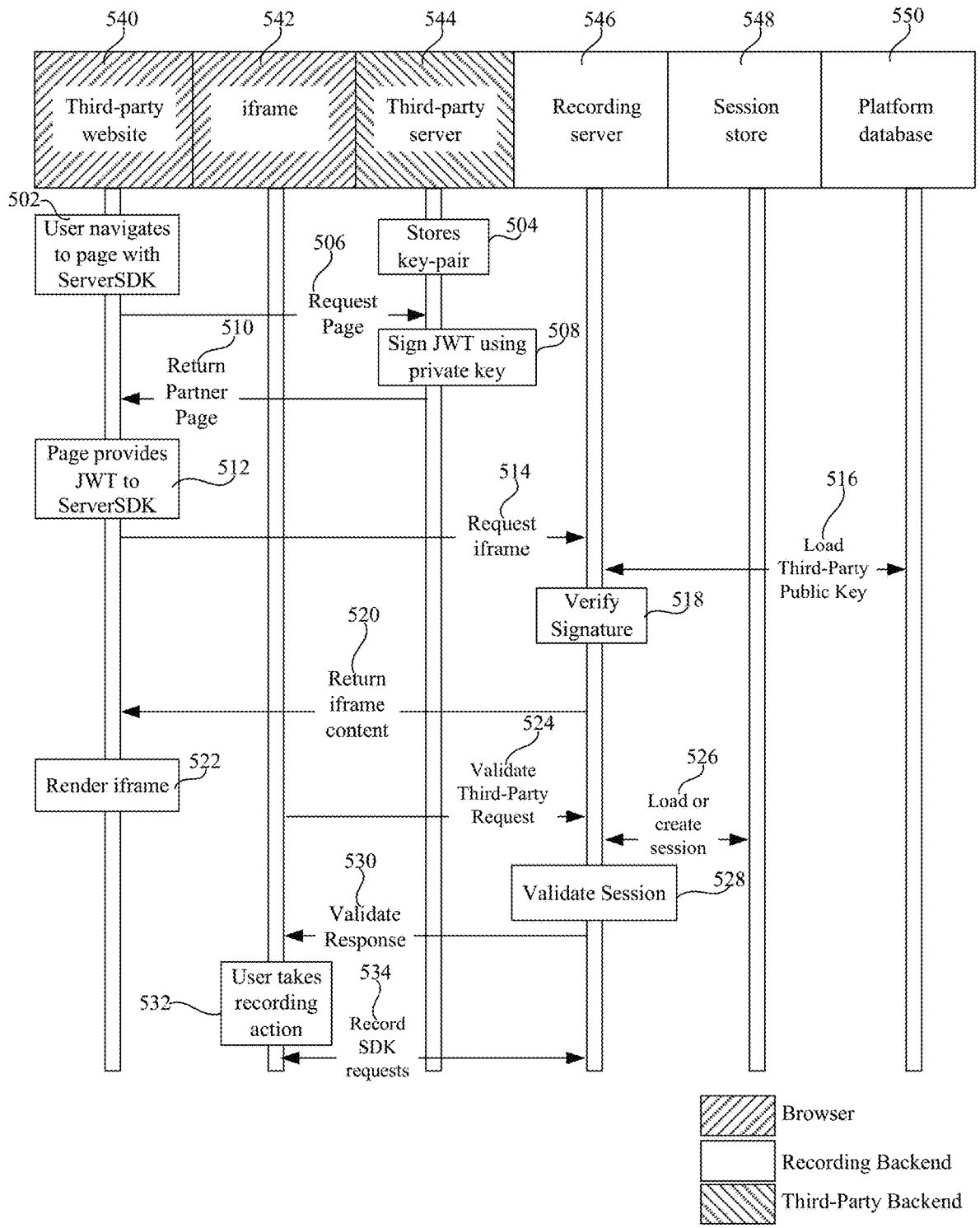
FIG. 5 shows a flow diagram of the process of accessing the third-party website and starting a third-party session, in accordance with a preferred embodiment of the present invention.
Figure 6:
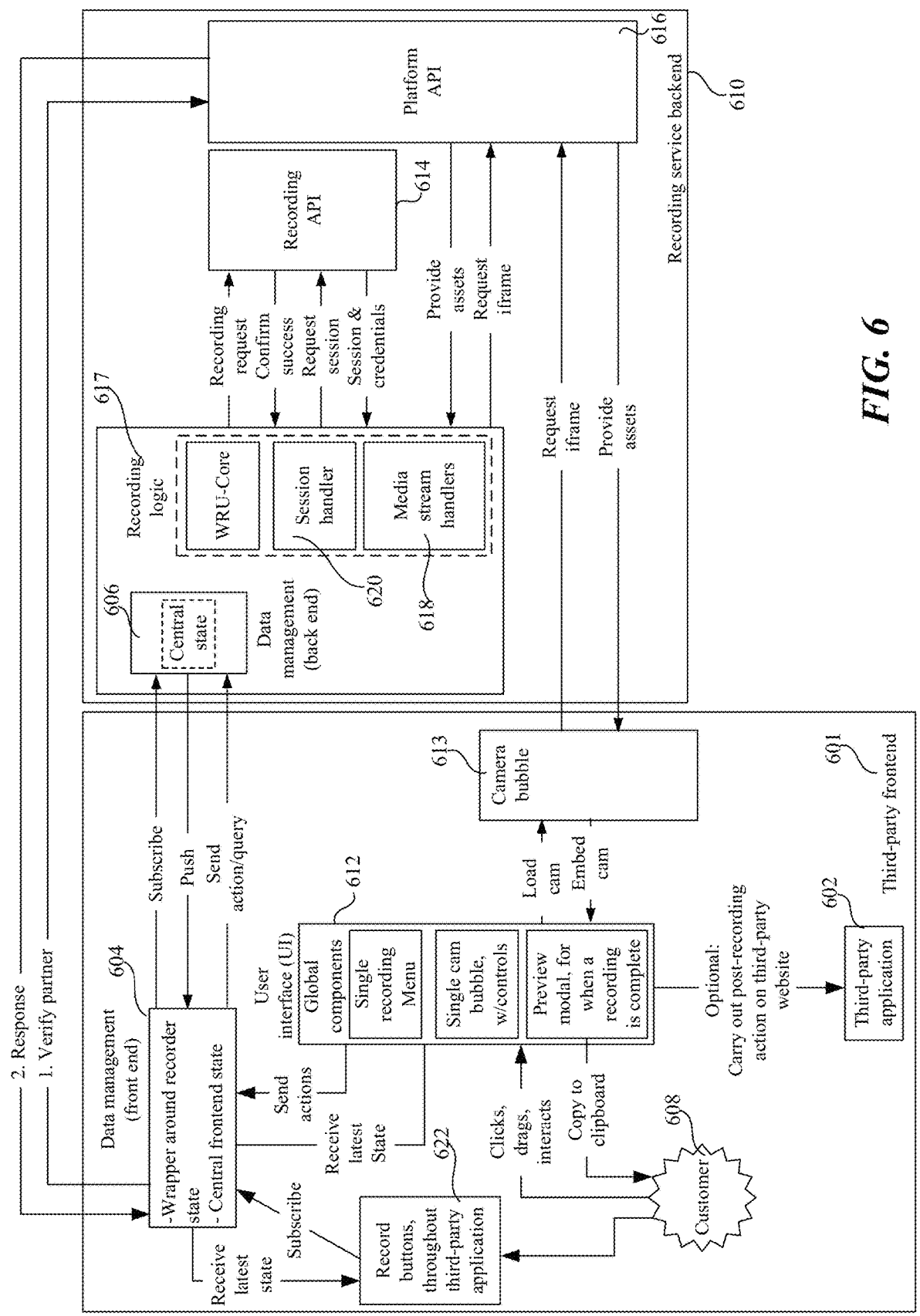
FIG. 6 depicts an illustrative system architecture diagram for loginless video recording from a third-party website viewed on a user device, in accordance with an exemplary embodiment of the present invention.

Some embodiments of the present invention leverage a recording software development kit (SDK) provided to the third-party website (110) by the operator of the recording server (108), as discussed in the context of FIGS. 5 and 6.

Loginlessness and Anonymity in Third-Party Services

The methods and systems described herein relate to providing a web-hosted recording service through a third-party website (i.e., a website that is not run by the recording server). The third-party website offers a recording service on one of its webpages (hereinafter the third-party webpage) and is hosted by a third-party server run by a third-party entity (e.g., application provider, service provider, content provider, etc.). The third-party entity hence provides access to a web-based service (e.g., video sharing, remote education, telepresence, telemedicine, etc.) for its users, through a network browser or a third-party application already installed on the user device.

In various embodiments of the present invention, the user is a subscriber of the third-party service, hence is known to the third-party entity (e.g., a member of the third-party user or client base, with a user record in a third-party user database). In various embodiments, the third-party entity is a partner of the recording service provider running the recording server. The recording service provider may be referred to herein as the operator of the recording server. For example, the recording service provider may provide recording services to members or visitors of the third-party website. Consequently, the third-party webpage, website, and server may be equivalently referred to as the partner webpage, website, and server respectively, since the third-party entity usually needs to be an established partner of the recording service provider in order to obtain recording services for its users.

Although the terms "recording services" and "video recording services" are used interchangeably herein, the methods described herein apply to any digital recording service offered through a server over a network for hosting and sharing purposes, including but not limited to video, audio, image, media, and multimedia recording. The video recording service is hence accessible via a third-party website, to be viewed by a user on a user device.

Loginlessness is defined herein as the absence of a requirement for the user to provide login information to a server in exchange for using a web-hosted service. Furthermore, anonymity is defined herein as the absence of a user-identity record incurred as a result of a web-hosted service, where a user-identity record is a user-identifying piece of data. Anonymity is thus defined as the absence of such a user-identity record at any relevant network entity, such as a server or an intermediate network node (e.g., router).

Figure 7:
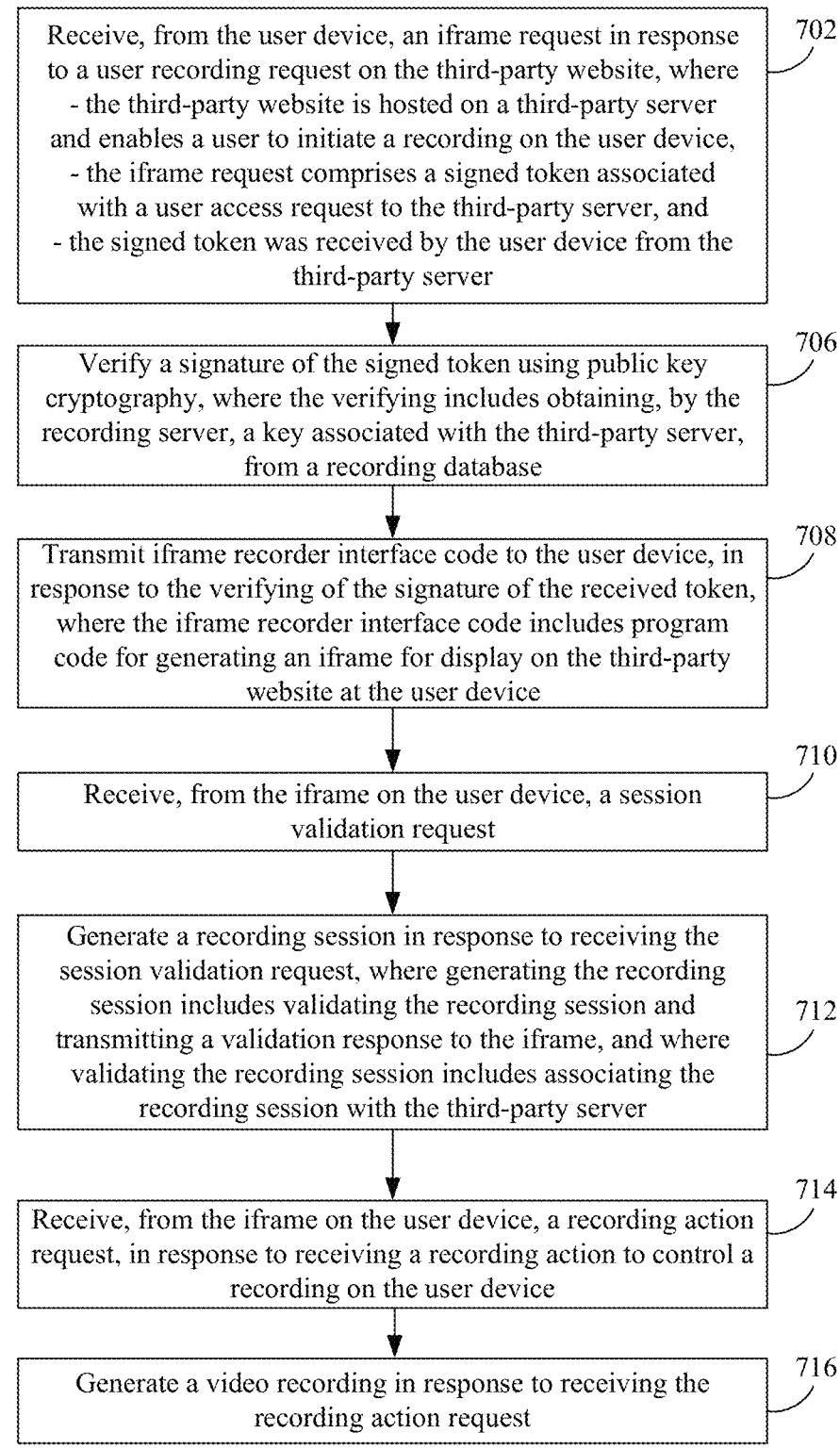
FIG. 7 illustrates a flowchart for loginless video recording from a third-party website on a user device, in accordance with an exemplary embodiment of the present invention.

Crucially, in relation to the methods and systems described herein, although the user may be known to the third-party entity, the user need not be a subscriber of the recording service. The recording service is therefore loginless in that it is provided to visitors (e.g., users) of the third-party website without any need for them to provide login credentials to the recording server. The recording service is also anonymous with respect to the recording service provider in that the recording server receives no user-identifying record. FIGS. 5, 6, and 7 describe embodiments enabling loginlessness and anonymity with respect to the recording server.

Loginlessness and anonymity as defined herein hence strictly apply from the perspective of the recording service provider rather than from the perspective of the third-party entity. Nevertheless, the methods described herein are required to enable absolute loginlessness (i.e., absence of any login action by the user at the third-party and recording servers) and absolute anonymity (i.e., absence of any user-identifying record at any of the network entities involved, including the third-party and recording servers). While absolute loginlessness is currently in use worldwide (e.g., the use of YouTube without logging in), absolute anonymity may require steps by the third-party server in addition to the ones described in FIGS. 5, 6, and 7.

Commercial anonymity is an intermediate level of anonymity defined herein as the absence of a user-identifying record at any of the network entities involved, except for the third-party server. Commercial anonymity clearly has tremendous commercial value, as it allows trusted third-party entities to provide anonymous recording services, or to add anonymous recording services to their existing service offerings, for their verified subscribers. So-called commercial anonymity also has practical value, as it can augment an existing web-based service using readily available website security and privacy measures. The methods described herein, particularly the embodiments described in FIGS. 5, 6, and 7 enable commercial anonymity.

Illustrative Example of a Web-Hosted Recording Service

Figure 2:
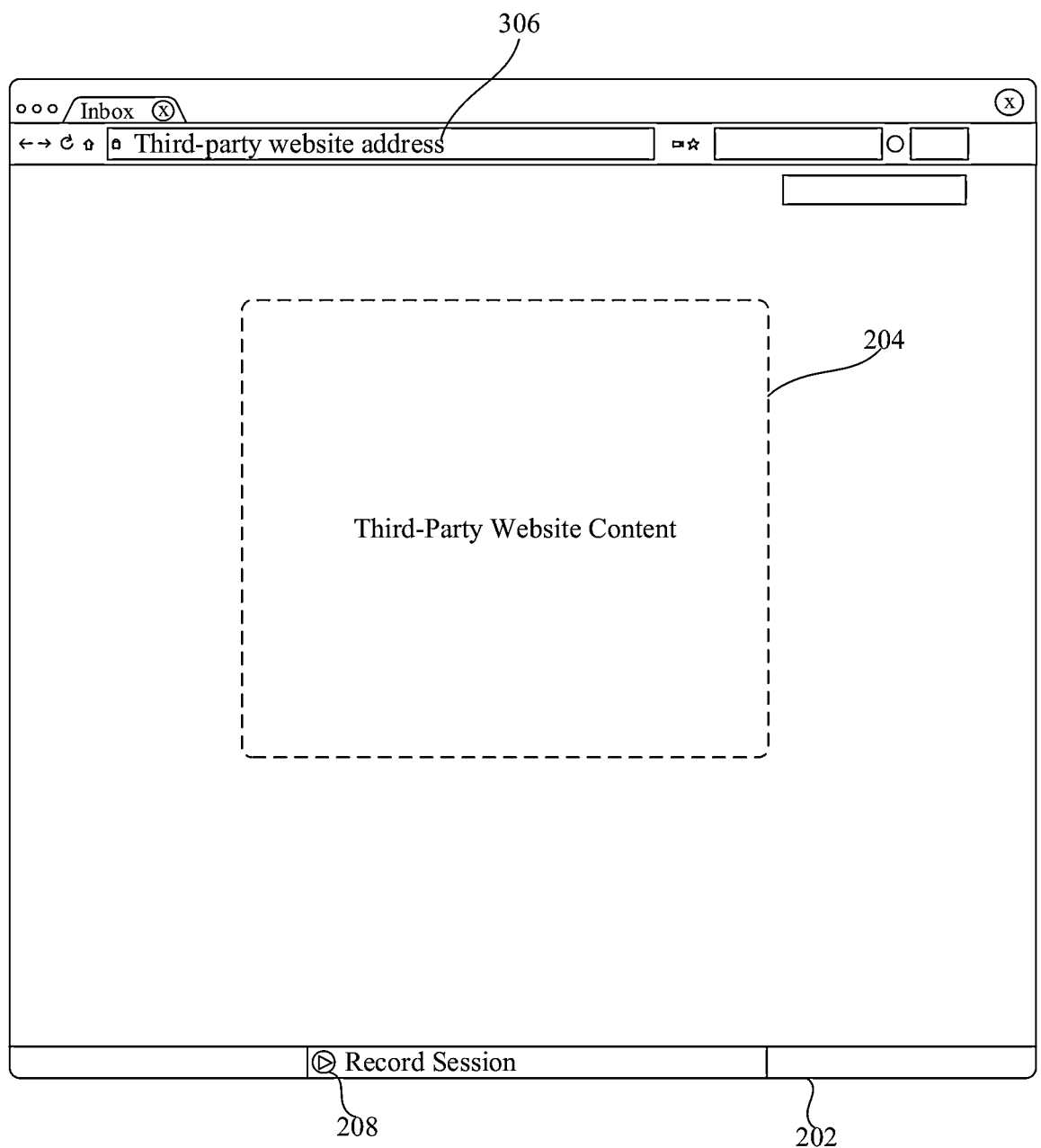
FIG. 2 shows a graphical user interface for video recording on the third-party website, depicting means for a user to start a recording session, in accordance with an exemplary embodiment of the present invention.

FIG. 2 shows a graphical user interface for video recording on the third-party website, depicting means for a user to start a recording session, in accordance with an exemplary embodiment of the present invention. The third-party server is configured to transmit the third-party website content (204) (e.g., an HTML page) to the user device for display, in response to receiving a user access request to access the third-party website address (206). The third-party website content (204) is displayed on a browser (202) of the user device. The third-party website content (204) may include a record session button (208) to initiate a recording of a video. Exemplary browsers (202) include Internet Explorer, Firefox, Google Chrome, Safari, and Opera.

Figure 3:
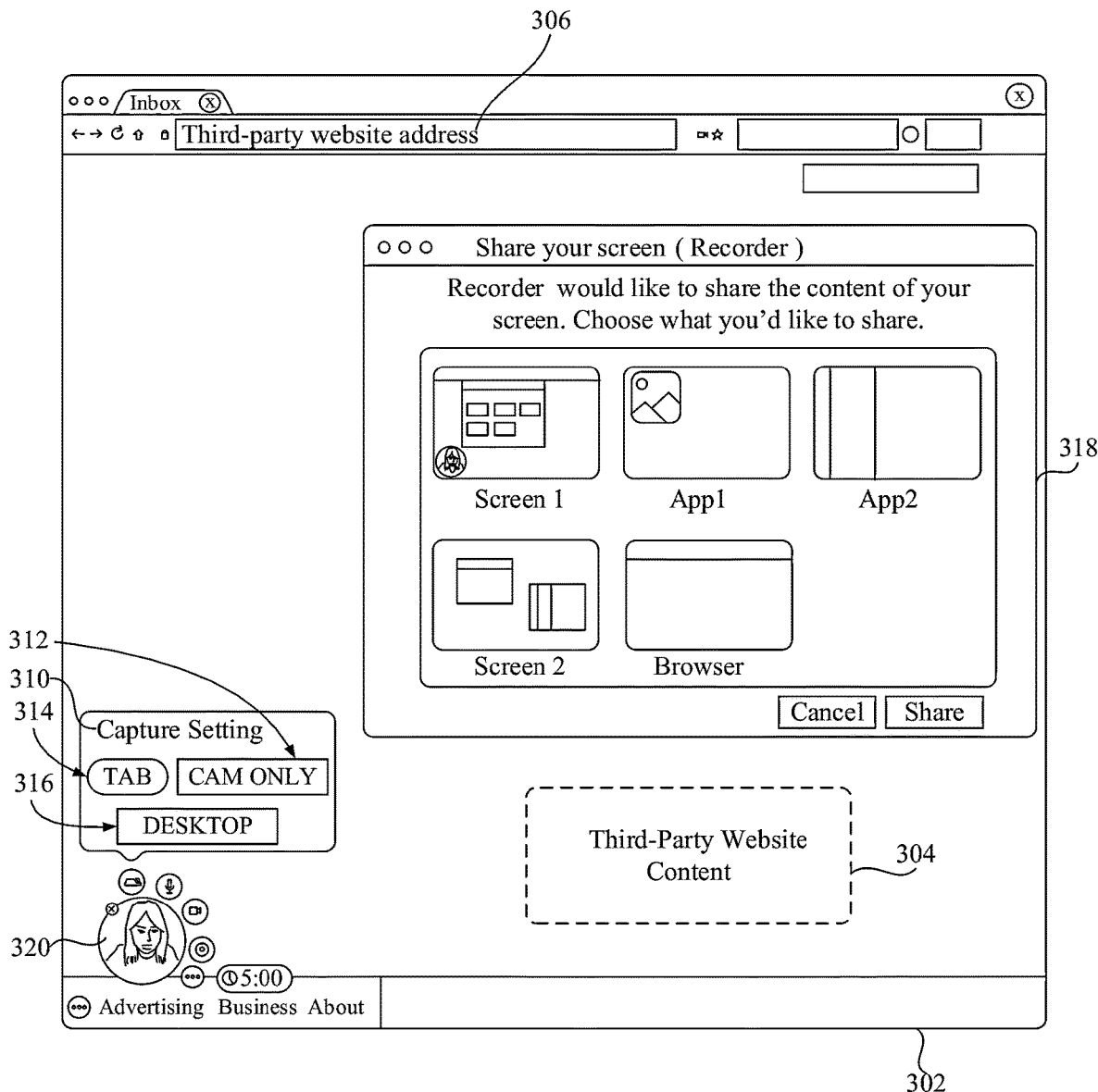
FIG. 3 depicts a graphical user interface for video recording on the third-party website, depicting capture setting selection, in accordance with an exemplary embodiment of the present invention.

FIG. 3 depicts a graphical user interface for video recording on the third-party website, depicting capture setting selection, in accordance with an exemplary embodiment of the present invention. FIG. 3 shows the browser (302) after the user enters the third-party website address (306) and clicks on the recording interface button (208). The video recording server is configured to transmit an embedded recording interface to the third-party website on the user device, in response to the user requesting a recording session. In some embodiments, once the user clicks on the record session button, the third-party website transmits an iframe request to the video recording server, where the iframe provides the video recorder interface on the third-party website (see FIG. 5). In one embodiment, the video recording server is configured to transmit iframe content to the user device, in response to the iframe request. The browser (302) on the user device displays the video recorder interface as part of the third-party website content (304). In some embodiments, the video recorder interface includes a capture setting box (310). The capture setting box (310) has one or more buttons providing one or more corresponding controls for the user to select what the user wants to record. The one or more buttons may include a tab (314) control enabling the expansion or collapse of the capture setting box (310), a cam only (312) control limiting the recording to one of the user device cameras, and a desktop (316) control enabling the recording of one or more screens or windows of the user device display. In one embodiment, a screen and window selection (318) window is also displayed when a recording session is requested by the user. The screen and window selection (318) enables the user to select which part of the desktop to record. In some embodiments, the user may select any of the active screens or windows displayed at the user device, where each active window is associated with an application running on the user device. Further, the video recorder interface includes a camera bubble (320) providing at least one or more recording controls to the user (see FIG. 4).

Figure 4:
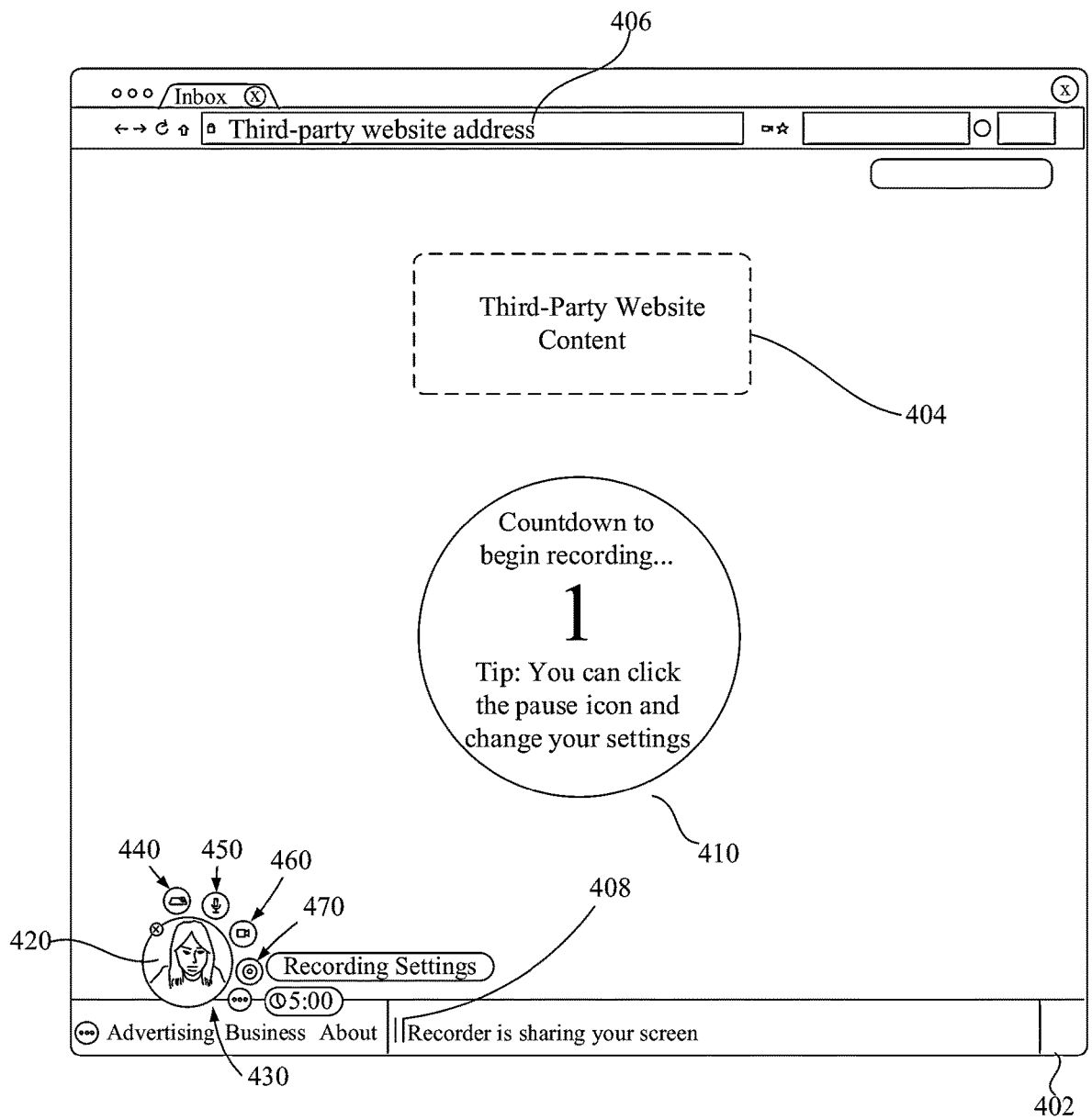
FIG. 4 illustrates a graphical user interface for video recording on the third-party website, depicting a camera bubble, in accordance with an exemplary embodiment of the present invention.

FIG. 4 shows a graphical user interface for video recording on the third-party website, depicting a camera bubble (420), in accordance with an exemplary embodiment of the present invention. FIG. 4 shows the browser (402) after the user enters the third-party website address (406), clicks on the recording session button (208), and uses the capture settings box (310) to select the screen or window (318) to be recorded. In one embodiment, the camera bubble (420) appears embedded within the third-party website content (404) on the browser (402) of the user device. The camera bubble (420) displays a view of the user video (430) as generated by a selected camera. In addition, the camera bubble (420) provides a set of recording controls to the user, such as a video record/stop button (470), a camera on/off button (460), a microphone on/off button (450), or a menu button (440) providing access to further functions and settings. FIG. 4 also shows a recorder settings button next to the record/stop button (470), providing access to recording settings such as camera selection.

In one embodiment, a countdown interface (410) appears in response to the user clicking on the record button (470), providing a countdown to the start of the video recording. The countdown interface (410) may include controls enabling pausing of the recording. The third-party website content (404) may replace the record session button (208) with another pause button (408) for the duration of the recording session, including the countdown. The recording session enables the user to perform recording actions such as starting, stopping, previewing, editing, and canceling a video recording. The user may also be enabled to delete, preview, edit, and post the recorded video to the third-party website. All such actions may be enabled without requiring the user to log into the video recording application or the video recording server.

In one embodiment, the user of the third-party website is enabled to exchange video messages with other users of the third-party website. The user is enabled to record and share any media or content (e.g., screen, video, audio, images, text, etc.) that are allowed to be recorded by the third-party website on the user device.

Architecture and Process for Loginless Web-Hosted Video Recording

FIG. 5 illustrates a flow diagram of an exemplary process for accessing the third-party website and starting a third-party session, depicting required messaging and operations at various communicating nodes, in accordance with a preferred embodiment of the present invention. Some embodiments of the present invention leverage a recording SDK to enable the recording interface. The recording SDK is provided to the third-party website or application developers by the operator of the recording server (e.g., the video service provider). FIG. 5 shows one such embodiment, where the recording SDK is denoted "ServerSDK".

In the embodiment of FIG. 5, the nodes involved in providing the loginless web-hosted video recording service include the third-party website (540), the video recording iframe (542), the third-party server (544), the video recording server (546), the session store (548), and the video recording platform database (550), where the third-party website (540) and the video recording iframe (542) are generated at the user device at different stages of the process. The video recording server (546), the session store (548), and the video recording platform database (550), are all part of the video recording backend. Note that the video recording platform database (550) is herein also referred to interchangeably as the video recording database, the recording database, or the platform database.

At the start of the exemplary process, the third-party server (544) stores a cryptographic key pair (504) enabling it to sign a token to be eventually used to initiate a loginless and anonymous third-party session between the third-party website (540) and the video recording server (546). In addition, at the start of the exemplary process, the third-party server (544) stores and serves a version of the third-party website (540) with means to initiate a video recording interface, such as a recording session button (see FIG. 2). The remaining steps of the exemplary process are as follows.

At step 502, the user navigates to the third-party website using a browser on the user device. At step 506, the third-party server (544) receives a user access request to access the third-party website, where the third-party website enables the user to record a video through a video recording interface, as discussed above. At step 508, the third-party server generates a signed token associated with the user access request, in response to receiving the user access request, where the token has been cryptographically signed by the third-party server (e.g., using a private key of the stored key pair). In one embodiment, the signed token is encrypted using a key known only to the video recording server. In various embodiments, the signed token is any signed object. In one embodiment, the token is a JavaScript Object Notation (JSON) Web Token (JWT). In another embodiment, the signed token includes a user session ID and a token validity time.

At step 510, the third-party server returns third-party webpage content to the user device for display, where the third-party webpage content includes the signed token. The third-party server signs (508) the token and transmits (510) the third-party website content to the user device in response to receiving (506) of the third-party website request. The third-party website (540) is thus generated at the user device by a browser or by a third-party application running on the user device.

At step 512, the third-party website provides the signed token to the video recording SDK, where the video recording SDK has been activated by a user recording request (e.g., clicking on the record session button). Consequently, the video recording SDK running on the third-party website instance of the user device transmits an iframe request to the video recording server at step 514, where the iframe request includes the signed token (512).

An iframe is an inline frame and is used to embed a hypertext markup language (HTML) document (e.g., recorder controls) within another HTML document (e.g., third-party webpage). It is defined using an <iframe> HTML tag. The iframe uses cross-frame browser messages (i.e., iframe messages) to communicate with the website or with a server. In FIG. 5, the iframe provides a full video recorder interface on the third-party website, as shown in FIGS. 3 and 4. iFrame recorder interface code includes program code for generating an iframe for display on the third-party website at the user device. iFrames are also referred to as video recording iframes herein.

In response to receiving the iframe request from the third-party website (540), the video recording server (546) is configured to verify the signature of the signed token using a cryptographic process. In one embodiment, at step 516, the video recording server loads a public key associated with the third-party server from a video recording platform database (550). At step 518, the video recording server verifies the signature of the received signed token using the key obtained from the video recording database. At step 520, the video recording server transmits iframe content to the user device, in response to verifying the signature of the received signed token. At step 522, the user device renders the iframe (542) based on the received iframe content, thus generating the video recording interface embedded in the third-party website (see FIGS. 3 and 4).

At step 524, the iframe transmits a session validation request to the video recording server in order to start a third-party session. At step 526, the video recording server generates a recording session in response to receiving the session validation request, where generating the recording session may include one of the following actions: requesting a recording session from the session store (548), creating a new recording session at the session store, loading the created recording session, and validating (528) the recording session at the video recording server. In one embodiment, validating the recording session includes associating the recording session with the third-party server. At step 530, the video recording server transmits a validation response to the iframe, in response to validating the recording session.

At step 532, the user utilizes the embedded video recording interface on the third-party website to take a recording action. The recording action may be a starting, stopping, previewing, editing, or canceling of the video recording. Recording actions hence control a recording on the user device. Each recording action leads to a recording action request from the iframe to the recording server. At step 534, the iframe transmits at least one recording action request in response to receiving a recording action from the user. Upon receiving (534) the recording action from the iframe, the video recording server executes it. In one embodiment, the video recording server generates a video recording upon execution of a "start" recording action. In another embodiment, the video recording server generates a link to a completed video recording upon executing a "stop" recording action. The video recording server may be configured for transmitting the link to the third-party website for display on the user device, and the link may appear as an embedded video on the third-party website.

Associating each third-party session with a guest account enables loginlessness and provides a level of anonymity for the user on the video recording backend in general as well as at the video recording server in particular (see earlier section "Loginlessness and Anonymity in Third-party Services"). A guest account allows a user to record media (e.g., videos) without being required to sign into or log into their own personal account on the recording server. The user may therefore not be fully unidentifiable throughout the network. However, as discussed above, the methods described herein enable loginlessness and are required for anonymous video recording. A guest, or "shared user," account (sometimes called a "ghost" account) is created in advance of any recording actions by the user as a pre-requisite for the video recording SDK setup. The guest account owns the user's recordings.

In one embodiment, the video recording server starts a third-party session when a recording session is requested by the user. A third-party session is a loginless and anonymous video recording session. Third-party sessions are associated with guest accounts. A third-party session ID indicates that a saved recording is owned by a given guest account. In addition to being associated with a given guest account, a third-party session is also associated with a web cookie value. Any recording that a user makes while sharing this web cookie allows the video recording server to identify the third-party session. Using the third-party session ID, the video recording server saves the video recording as being owned by the guest account.

In one exemplary embodiment, the video recording server (546) creates a new third-party session upon receiving (514) the iframe request from the user device. In this embodiment, the video recording server is configured to generate a video recording upon executing (534) a starting of the video recording (i.e., a "start" recording action), where the guest account is activated by the executing of the starting of the video recording (i.e., a "start" recording action), and where the guest account owns the video recording. In another exemplary embodiment, the video recording server is configured to generate a link to a completed video recording upon executing (534) a stopping of the video recording (i.e., a "stop" recording action), where the guest account is deactivated by the executing of the stopping of the video recording (i.e., a "stop" recording action).

In one embodiment, the third-party session generated at the video recording server in response to receiving (514) an iframe request is associated to the iframe by the video recording server. Consequently, all recording action requests emanating from the iframe (542) are associated with the guest account at the video recording server (546), and any video recording generated within the third-party session is owned by the guest account. Once a video recording is ended (e.g., through a "stop" recording action [534] from the user device), the third-party session is terminated and the recording is finalized by the video recording server. The video recording server then disables the guest account, terminates the iframe (542) at the third-party website (540), and sends a video recording link to the third-party website for processing by the third-party website. In one embodiment, the third-party website (540) uses the link to display the video recording as an embedded video within the third-party website.

In one embodiment, the video recording service SDK that is part of the third-party website content stored on the third-party server (544) is updated regularly and automatically by the video recording server (546). In another embodiment, the video recording service SDK that is part of the third-party website content stored on the third-party server (544) is updated upon receipt by the third-party server (544) of a third-party website request (506).

FIG. 6 depicts an illustrative system architecture diagram for loginless video recording from a third-party website viewed on a user device, in accordance with an exemplary embodiment of the present invention. At the third-party frontend (601), the system architecture includes the third-party application (602), the data management frontend (604), the user (608), the video recording user interface (UI) (612), and the camera bubble logic (613). On the recording service backend (610), the system architecture includes the data management backend (606), the recording logic (617), the recording API (614), and the platform API (616).

The third-party website/application has a video recording UI that allows the user to record the video through the user device. The video recording UI (612) includes recorder menus/controls, including an interface for initiating a camera bubble, that allows the user to record and/or edit a video. The camera bubble logic (613) generates a camera bubble that pops up on the user device (e.g., within the third-party website or application) when the user gives the camera permission on the user device and starts a recording session. A record button (622) is provided on the third-party website or application. The camera bubble has various control buttons to control the recording of the video, as described in FIGS. 3 and 4. For example, a circular window on the user screen may show the camera output.

The data management frontend (604) communicates with the video recording API (616) to verify the identity of the third-party website. The data management backend (606) keeps track of recording state. The data management frontend (604) keeps recording state in sync with the data management backend (606). The central state at the data management backend (606) holds the true status of the recording session (e.g., whether the session has started, ended, has an error, is in the middle of uploading, etc.). The status on the third-party frontend (601) gets updated through push operations. Recorder "state" includes multiple parameters such as user account details (if the user is logged into the third-party website), the status of the video, video duration limit, recording limit (e.g., file size), and other parameters that control the look and feel of the recording menu. The data management frontend (604) and backend (606) provide the interface for the third-party application/website (602) and the video recording service backend (610) to communicate with each other. The video recording service backend (610) is configured to create one instance of recorder per video initialized. The recording logic (617) includes the recording core, a session handler (620), and media stream handlers (618).

The video recording service backend (610) is configured to receive the video and audio streams from the user device and store the recorded video and/or audio streams to generate a finalized video via the recording API (614). The platform API (616) is configured to provide core service components, such as iframe, and to validate the third-party website. The session handler (620) requests session credentials, manages storage bucket credentials (e.g., over Amazon S3), and requests sessions. The recording logic (617) is configured to manage the recording action requests (e.g., start/stop recording) from the third-party website or application on the user device.

FIG. 7 illustrates a flowchart for loginless video recording from a third-party website on a user device, in accordance with an exemplary embodiment of the present invention. Specifically, FIG. 7 shows the steps carried out by the recording server (546), according to one embodiment of the present invention.

In step 702, the recording server receives from the user device an iframe request in response to a user recording request on the third-party website, where the third-party website is hosted on a third-party server and enables a user to initiate a recording on the user device, the iframe request includes a signed token associated with a user access request to the third-party server, and the signed token was received by the user device from the third-party server.

In step 706, the recording server verifies a signature of the signed token using public key cryptography, where the verifying includes obtaining a key associated with the third-party server from a recording database.

In step 708, the recording server transmits iframe recorder interface code to the user device, in response to the verifying of the signature of the received token, where the iframe recorder interface code includes program code for generating an iframe for display on the third-party website at the user device. In step 710, the recording server receives a session validation request from the iframe on the user device.

In step 712, the recording server generates a recording session in response to receiving the session validation request, where generating the recording session includes validating the recording session and transmitting a validation response to the iframe, and where validating the recording session includes associating the recording session with the third-party server.

In step 714, the recording server receives a recording action request from the iframe on the user device, in response to receiving a recording action to control a recording on the user device. Finally, in step 716, the recording server generates a video recording in response to receiving the recording action request.

Alternative Embodiments

In various embodiments, a system for loginless video recording from a third-party website viewed on a user device is disclosed. The system includes a third-party server, a video recording server, and a video recording database. The third-party server is configured to receive a user access request to access a third-party webpage, where the third-party webpage enables a user to record a video; generate a signed token associated with the user access request, in response to the receiving of the user access request; and transmit third-party webpage content to the user device for display, where the third-party webpage content includes the signed token. The user device is configured to transmit an iframe request to the video recording server, in response to a user recording request, where the iframe request includes the signed token. The video recording server is configured to verify the signature of the received signed token, using public key cryptography, where the verifying includes obtaining, by the video recording server, a key associated with the third-party server, from the video recording database, and transmitting iframe content to the user device, in response to the verifying of the signature of the received token. Further, the user device is configured to generate an iframe for display on the third-party website, based on the received iframe content. The iframe is configured to transmit a session validation request to the video recording server. The video recording server is configured to generate a recording session in response to the receiving of the session validation request. Further, the iframe is configured to transmit a recording action request to the video recording server, in response to receiving a recording action from the user.

In one embodiment, the video recording server is further configured to validate the recording session and transmit a validation response to the iframe, where validating the recording session includes associating the recording session with the third-party server.

Recorder Functionality

Embodiments of the present invention relate to methods and systems for sharing media such as audio, video, and images (e.g., screen-capture images) instantaneously and asynchronously. FIGS. 8A, 8B, 9, and 10 provide a detailed description of the recorder functionality pertinent to the methods and systems described herein, particularly the user device and recording server (see FIG. 1).

Figure 8A:
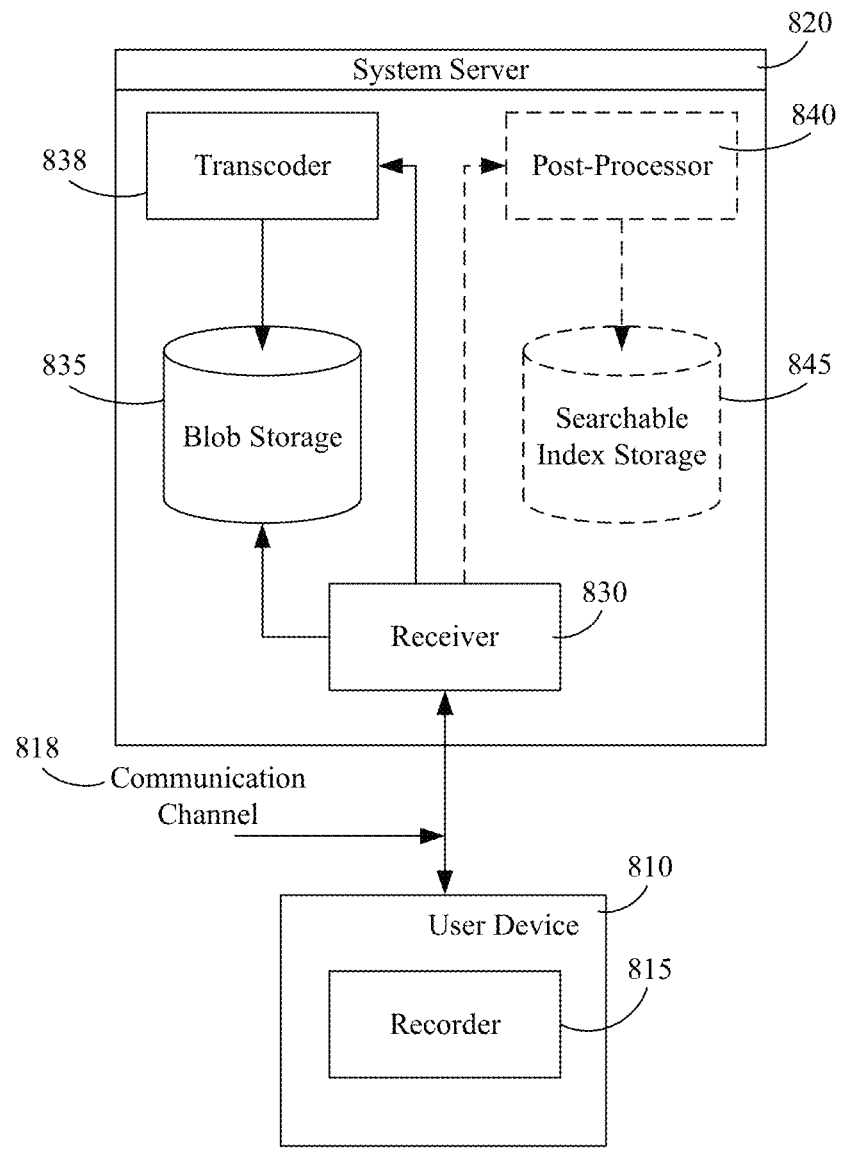
FIG. 8A is an illustrative system architecture diagram showing video recording functionality, according to one embodiment of the present invention.

FIG. 8A is an illustrative system architecture diagram showing video recording functionality, according to one embodiment of the present invention. A user device (810) contains a recorder (815) capable of recording from a display screen on the user device (810), from an application displayed on the user device (810), or from one or more optical cameras on the user device (810). The user device (810) is connected to a receiver (830) within a system server (820) through a communication channel (818). The communication channel (818) may be established between the user device (810) and the system server (820) before the recording is initiated, while the recording is taking place, or after the recording has been completed. The receiver (830) may send the received recording directly to a storage unit such as a blob storage (835) on the system server (820). In some embodiments, such storage units may be permanent and may be used to store raw data or post-processed data such as transcoded data. In some embodiments, such storage units may be non-permanent, thus allowing temporary caching of the data stream while the data stream is handled by a post-processor, or post-processing pipeline, such as a dedicated transcoder (838) or general post-processor (840). Each of the transcoder (838) or post-processor (840) may be physical or logical components implemented in dedicated or general purpose hardware. In some embodiments, received data are first post-processed through a transcoder (838) before the transcoded media recording is sent to blob storage (835). Transcoding may be considered as a post-processing process, as raw or even post-process data is converted from one format to another. Concurrently or in tandem, the received recording may optionally be post-processed through a post-processor (840), which may perform functions such as audio extraction, object detection, speech-to-text conversion, phoneme search, eye tracking, sentiment analysis, behavioral analysis, and gesture analysis. The post-processor may further be connected to optional searchable index storage (845). Although not shown explicitly on the figure, post-processed media recordings generated by the post-processor (840) may also be passed to the transcoder (838), stored in the blob storage (835), or sent to any other permanent or non-permanent storage units or control components that provide video hosting and sharing services such as on-demand replay, streaming, video searches, and user management.

Figure 8B:
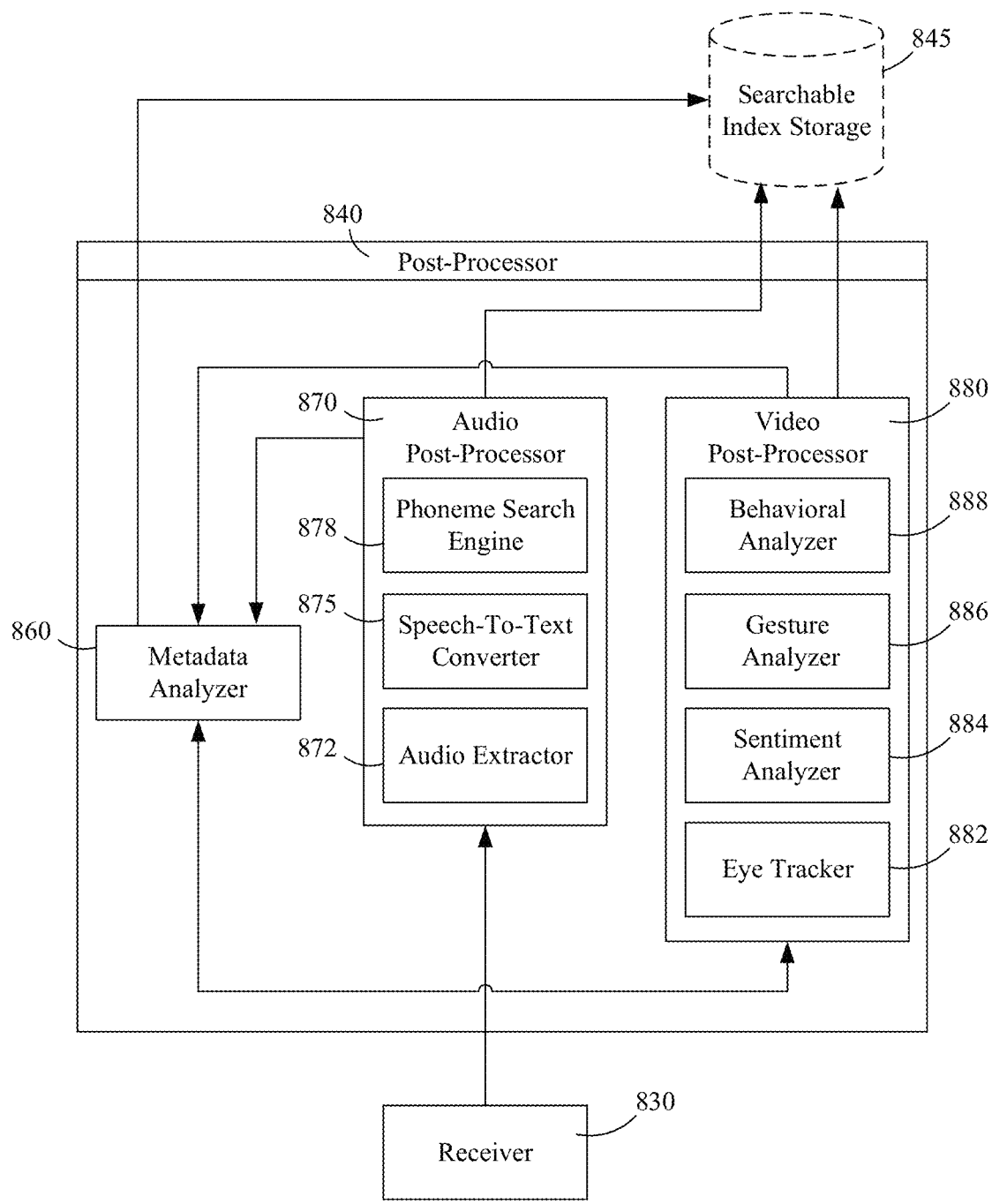
FIG. 8B is an illustrative architecture diagram for the video recording post-processor, according to one embodiment of the present invention.

FIG. 8B shows an illustrative architecture diagram for the post-processor (840). In some embodiments, media data received at the receiver (830) may be sent to a metadata analyzer (860), an audio post-processor (870), and/or a video post-processor (880). The metadata analyzer (860) analyzes any metadata that may already be present in the received media data and may further generate individual metadata items as needed. In the audio post-processor (870), audio extraction may be performed by an audio extractor (872), speech-to-text conversion may be done by a speech-to-text converter (875), and phoneme search may be performed by a phoneme search engine (878). Audio data may be processed concurrently or in tandem in different orders through these modules. In the video post-processor (880), video features including, but not limited to, eye movements, sentiments, gestures, and behaviors, may be analyzed by an eye tracker (882), a sentiment analyzer (884), a gesture analyzer (886), and a behavioral analyzer (888). As in the audio post-processor, video data may be processed concurrently or in tandem in different orders through these modules. The audio post-processor (870) and/or the video post-processor (880) may feed their results back into the metadata analyzer (860). In some embodiments, the received recording is streamed asynchronously as it is being recorded. In some embodiments, the received media data may be from an upload of a recorded media file. In both cases, a self-contained data unit containing information about the video file called a "metadata atom" may be used for playing a streamable media file. The metadata analyzer (860) may generate a metadata atom in real-time as the media stream object is uploaded to the server if such a metadata atom does not already exist, or may move it in real-time to the beginning of a media file if such a metadata atom already exists. The metadata analyzer (860) may write a new file with that metadata atom at the front into a searchable index storage (845). The rest of the upload from the receiver, or processed versions from the video post-processor (880), may be streamed and tacked onto that metadata atom so that the file is immediately ready for consumption and storage as soon as the upload completes.

Figure 9:
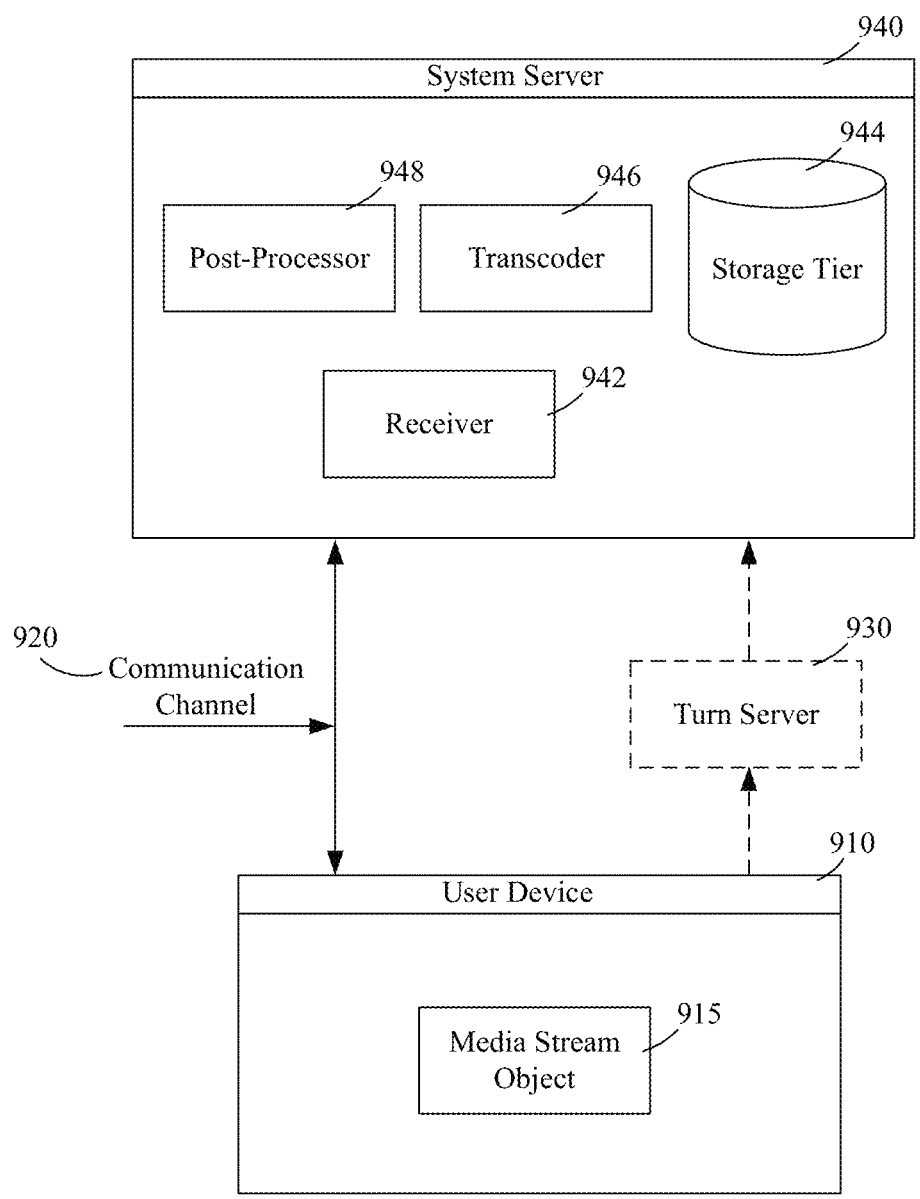
FIG. 9 is a block diagram illustrating data flow for curated media recording, according to one embodiment of the present invention.

More particularly, FIG. 9 shows a schematic block diagram illustrating data flow for curated media recordings, according to one embodiment of the present invention. A recording generated on a user device (910) may include a combination of screen capture, front-facing camera capture, back-facing camera capture, and user annotations and dictations. Upon the start of a recording session, a screen display on the user device (910), or any application running on the user device (910) and displayed on the display screen, may be captured. A partner application on the user device (910) may then set up a media stream object (915) on the user device containing the recording, and upload the media stream object to a system server (940) through a communication channel (920) established between the user device (910) and the system server (940). The communication channel (920) may employ any lossless transmission protocols such as WebSocket, or any lossy and potentially real-time protocols such as WebRTC. In some embodiments, a TURN server (930) may optionally be needed when a lossy transmission protocol such as WebRTC is used, if symmetry between the two ends of the communication channel cannot be achieved, as is further described in U.S. Pat. No. 9,641,566. A receiver (942) in the server 940 receives the transmitted media stream object which contains media recording captured by the user device 910. The received media recording may then be stored in a storage tier (944) or may be sent to a transcoder (946). The received media recording may also be sent to a post-processor (948) before or in parallel with the transcoding process. Post-processed data or transcoded data may then be stored through a storage tier (944). In other words, the storage tier (944) may store raw or post-processed media recordings in any format appropriate for media storage and/or sharing. For example, the storage tier (944) may be a blob storage. In some embodiments, the storage tier (944) may be a content delivery tier, and the system server (940) may serve as a node within a content delivery network (CDN). In some other embodiments, the system server (940) may be connected to a CDN or to a parallel storage connected to a CDN for redundancy. Connection to and interaction with a CDN allows for immediate sharing of the raw recording content as soon as the recording process is completed. As previously discussed, while the media stream object (915) is transmitted through the communication channel (920) to the system server (940), the system server (940) may optionally initiate a post-processing pipeline internally by sending the received media recordings to the post-processor (948). Furthermore, a recording user may instruct through the user device (910) whether recorded content may be shared immediately.

Upon receipt of a publication request for the recorded content as collected from or input by the user through the user device (910), the system server (940) may end a currently progressing post-processing pipeline before making post-processed media content available. For example, in response to receiving the publication request, the system server (940) may make the received raw recording or post-processed recording accessible to one or more viewers within an immediate time frame, where the immediate time frame is a time to upload or receive a remaining number of bytes to the server, from the publication request time, plus a time to complete processing the remaining number of bytes to generate a complete video file for download by one or more viewers at the server. In some embodiments, the system server (940) may end the recording by continuing to receive the data recording upload until an end of file signal is detected, and start a new post-processing pipeline within the server to post-process the received recording. If immediate viewing of a raw, transcoded or post-processed media stream is desired, the previous step as discussed may be modified to stream raw data as received by the receiver (942) to both the storage tier (944) and/or the post-processing pipeline (948) in parallel or in tandem. In other words, every process may be fully streamed, where media data is handled on a byte-by-byte, frame-by-frame, or segment-by-segment basis. As a post-processing pipeline is completed, post-processed recordings may be made accessible to one or more viewers. In some embodiments of the present invention, the post-processing pipeline may perform post-processing functions including, but not limited to, transcoding, audio extraction, video processing indexing, object detection, speech-to-text conversion, phoneme search, eye tracking, sentiment analysis, behavioral analysis, and/or gesture analysis. Thus, in some embodiments, the transcoder (946) may be implemented as a particular instance of the post-processor (948).

Figure 10:
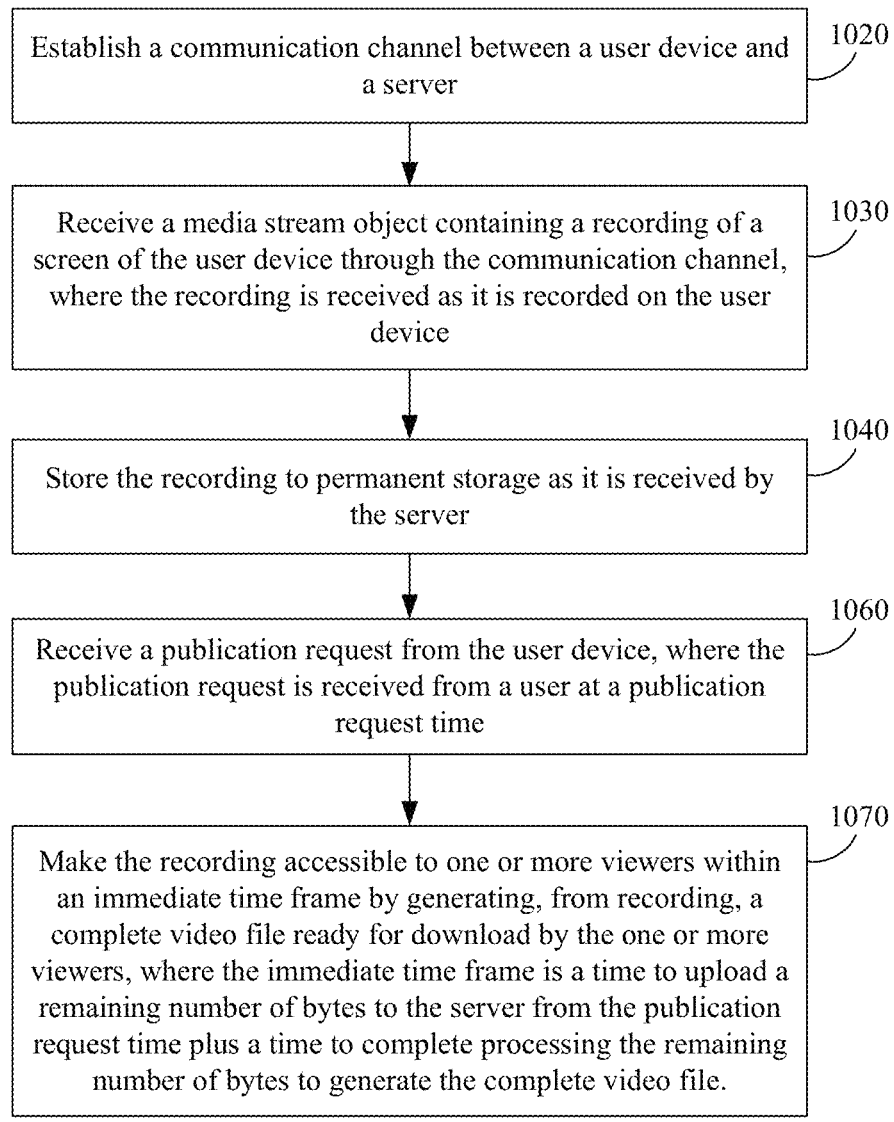
FIG. 10 is a flowchart illustrating a process for instantaneous asynchronous media sharing, according to one embodiment of the present invention.

FIG. 10 is a flowchart illustrating a process for instantaneous asynchronous media sharing, according to one embodiment of the present invention. Upon initiation, at step 1020, the system may establish a communication channel between a user device and a server. Next, at step 1030, the system receives a media stream object containing a recording of a screen of the user device through the communication channel, where the recording is received as it is recorded on the user device. The system further stores the recording to permanent storage as the recording is received by the server at step 1040. The system server may optionally initiate a post-processing pipeline to post-process the received recording. Whether with or without a post-processing pipeline, at step 1060, the system receives a publication request from the user device, where the publication request is received from a user through the user device at a publication request time. In response to receiving the publication request, at step 1070, the recording is made accessible to one or more viewers within an immediate time frame, where the immediate time frame is a time to upload a remaining number of bytes to the server from the publication request time plus a time to complete processing the remaining number of bytes to generate a complete video file ready for download by one or more viewers at the server. In other words, the recording is made accessible to the viewers through the generation of the complete video file from the recording, where the complete video file is ready for download from the server by one or more viewers. Such a generation process may involve simply completing the streamed upload of the recording and making it into a file entity, or may involve further post-processing steps as previously discussed.

While a recording is being made and uploaded, there may be different consumption patterns. In some embodiments, the consumption pattern is a live streaming from the recording user to the server, and through the server to the viewer. Consequently, the post-processing pipeline does not need to complete before the media is consumed. In some embodiments, the consumption pattern may be asynchronous video messaging, for which a subset of the post-processing pipeline must be finished or completed shortly or immediately after the publication request is received, in order for the post-processed recording to be made accessible. In some embodiments, the publication request is in the form of an end of transmission or end of file signal. In such cases, the post-processing process may be automatically completed upon the detection of such signals. Additionally, in some embodiments, a viewer may have the same access as the uploading user to open source or proprietary media container formats and players, such as a WebM-playable browser, where WebM is an open Media file format. The post-processing may then simply consist of uploading the video to a storage layer that backs it up to a CDN, and raw data may be consumed directly. In another example where a viewer's browser is not WebM-playable, the post-processing; may include a transcoding step, where a final conversion to the MPEG-4 or MP4 media format is performed, and metadata such as defined through a metadata atom is constructed as part of the streamed transcoding process. Metadata atoms are discussed in more specific embodiments in U.S. Pat. No. 9,641,566. In both cases, the time-to-consumption, when bytes are uploaded as soon as they are recorded, is the time it takes for the server to process the byte stream until the last byte is processed. The parallelism in recording, uploading, and streamed t-processing ensures that such time-to-consumption is so fast as to seem almost instantaneous. However, if transmission speeds are lower than optimal, then some down-sampling operations such as compressions may be performed on the recording data device first, and alternative communication protocols may be used, taking into account the quality of service desired, including but not limited to, error rate, throughput, and uplink and downlink transmission delays.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may, for example, be in direct or indirect communication with one another over the same or different wired or wireless networks. Additionally, while FIGS. 11 and 12 illustrate the various system entities as separate, standalone entities, the various embodiments are not limited to this particular architecture.

Exemplary Management Computing Entity

Figure 11:
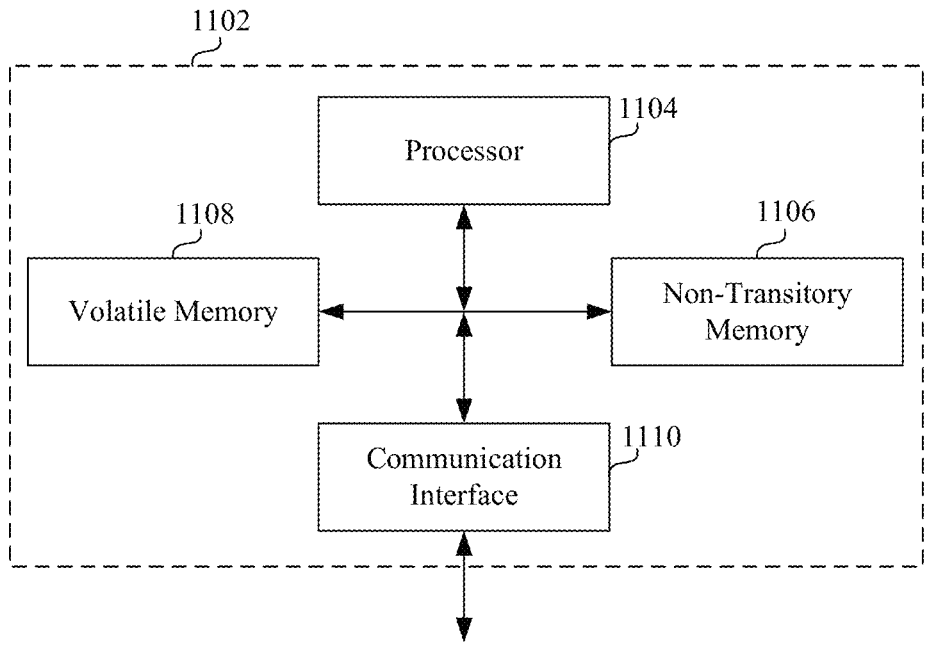
FIG. 11 provides a schematic of a server (management computing entity) for web-hosted recording according to one embodiment of the present invention.
Figure 12:
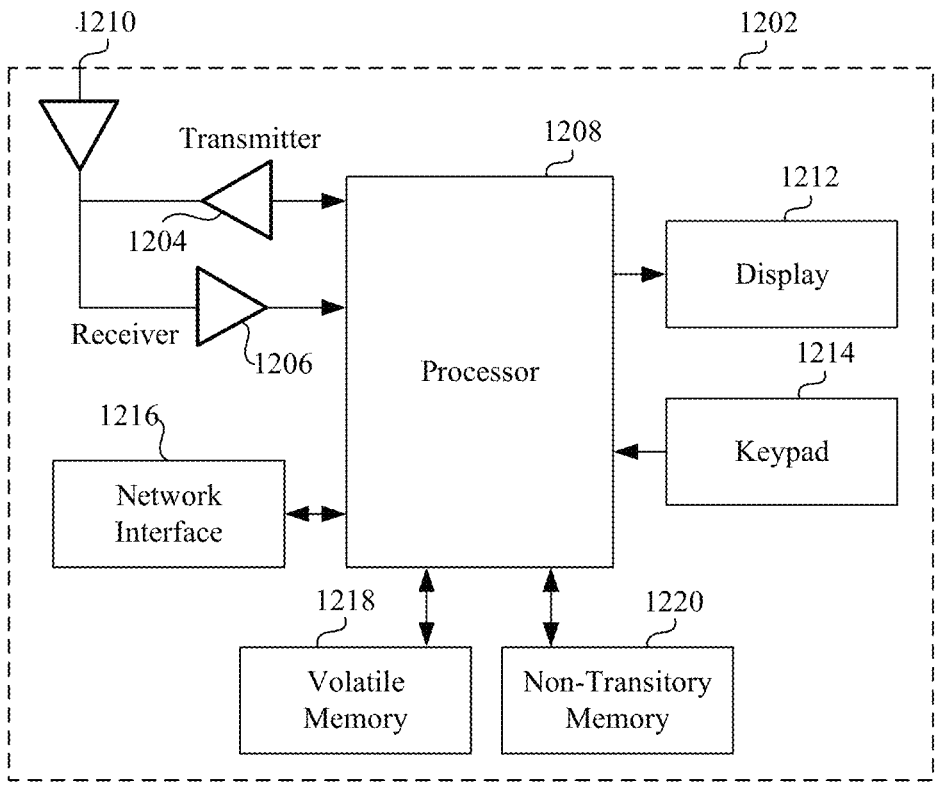
FIG. 12 provides an illustrative schematic representative of a web-hosted recording client (user computing entity) that can be used in conjunction with embodiments of the present invention.

FIG. 11 provides a schematic of a server (management computing entity, 1102). Specifically, FIG. 11 provides a schematic of a server (management computing entity) for web-hosted recording according to one embodiment of the present invention. In general, the terms computing entity, computer, entity, device, system, and/or similar words used herein interchangeably may refer to, for example, one or more computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably).

As indicated, in one embodiment, the management computing entity (1102) may also include one or more communications interfaces (1110) for communicating with various computing entities, such as by communicating data, content, and/or information (similar terms used herein interchangeably) that can be transmitted, received, operated on, processed, displayed, stored, and/or the like.

As shown in FIG. 11, in one embodiment, the management computing entity (1102) may include or be in communication with one or more processors (i.e., processing elements, 1104, also referred to as processors and/or processing circuitry, and similar terms used herein interchangeably) that communicate with other elements within the management computing entity (1102) via a bus, for example. The processor (1104) may be embodied in a number of different ways. For example, the processor (1104) may be embodied as one or more complex programmable logic devices (CPLDs), microprocessors, multi-core processors, coprocessing entities, application-specific instruction-set processors (ASIPs), microcontrollers, and/or controllers. Further, the processor (1104) may be embodied as one or more other processing devices or circuitry. The term circuitry may refer to an entire hardware embodiment or to a combination of hardware and computer program products. Thus, the processor (1104) may be embodied as integrated circuits, application-specific integrated circuits (ASICs), field-programmable gate arrays (FPGAs), programmable logic arrays (PLAs), hardware accelerators, other circuitry, and/or the like. As will therefore be understood, the processor (1104) may be configured for a particular use or configured to execute instructions stored in volatile or non-volatile (or non-transitory) media or otherwise accessible to the processor (1104). As such, whether configured by hardware or computer program products, or by a combination thereof, the processor (1104) may be capable of performing steps or operations according to embodiments of the present disclosure when configured accordingly.

In one embodiment, the management computing entity (1102) may further include or be in communication with non-transitory memory (also referred to as non-volatile media, non-volatile storage, non-transitory storage, memory, memory storage, and/or memory circuitry—similar terms used herein interchangeably). In one embodiment, the non-transitory memory or storage may include one or more non-transitory memory or storage media (1106), including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The non-volatile (or non-transitory) storage or memory media may store databases, database instances, database management systems, data, applications, programs, program modules, scripts, source code, object code, byte code, compiled code, interpreted code, machine code, executable instructions, and/or the like. The terms database, database instance, and/or database management system (similar terms used herein interchangeably) may refer to a collection of records or data stored in a computer-readable storage medium using one or more database models, such as a hierarchical database model, a network model, a relational model, an entity-relationship model, an object model, a document model, a semantic model, a graph model, and/or the like.

In one embodiment, the management computing entity (1102) may further include or be in communication with volatile media (also referred to as volatile storage, memory, memory storage, memory and/or circuitry—similar terms used herein interchangeably). In one embodiment, the volatile storage or memory may also include one or more volatile storage or memory media 1108, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processor (1104). Thus, the databases, database instances, database management systems, data, applications, programs, program modules, scripts, source code, object code, byte code, compiled code, interpreted code, machine code, executable instructions, and/or the like may be used to control certain aspects of the operation of the management computing entity (1102) with the assistance of the processor (1104) and operating system.

As indicated, in one embodiment, the management computing entity (1102) may also include one or more communications interfaces (1110) for communicating with various computing entities, such as by communicating data, content, and/or information (similar terms used herein interchangeably) that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the management computing entity (1102) may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown in the figure, the management computing entity (1102) may include or be in communication with one or more input elements, such as a keyboard input, a mouse input, a touch screen/display input, a motion input, a movement input, an audio input, a pointing device input, a joystick input, a keypad input, and/or the like. The management computing entity (1102) may also include or be in communication with one or more output elements (not shown), such as an audio output, a video output, a screen/display output, a motion output, a movement output, and/or the like.

Furthermore, one or more of the components of the management computing entity (1102) may be located remotely from other management computing entity (1102) components, such as in a distributed system. One or more of the components may be combined and additional components performing functions described herein may be included in the management computing entity (1102). Thus, the management computing entity (1102) can be adapted to accommodate a variety of needs and circumstances. These architectures and descriptions are provided for exemplary purposes only and are not limiting to the various embodiments.

Exemplary User Computing Entity

A user may be an individual, a company, an organization, an entity, a department within an organization, a representative of an organization and/or person, and/or the like. FIG. 12 provides an illustrative schematic representative of a client (user computing entity, 1202) that can be used in conjunction with embodiments of the present disclosure. In general, the terms device, system, computing entity, entity, and/or similar words used herein interchangeably may refer to, for example, one or more computers, computing entities, desktops, mobile phones, tablets, phablets, notebooks, laptops, distributed systems, gaming consoles, watches, glasses, key fobs, radio frequency identification (RFID) tags, earpieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. User computing entities (1202) can be operated by various parties. As shown in FIG. 12, the user computing entity (1202) can include an antenna (1210), a transmitter (1204) (e.g., radio), a receiver (1206) (e.g., radio), and a processor (i.e., processing element) (1208) (e.g., CPLDs, microprocessors, multi-core processors, coprocessing entities, ASIPs, microcontrollers, and/or controllers) that provides signals to and receives signals from the transmitter (1204) and receiver (1206), respectively.

The signals provided to and received from the transmitter (1204) and the receiver (1206), respectively, may include signaling information in accordance with air interface standards of applicable wireless systems. In this regard, the user computing entity (1202) may be capable of operating with one or more air interface standards, communication protocols, modulation types, and access types. More particularly, the user computing entity (1202) may operate in accordance with any of a number of wireless communication standards and protocols, such as those described above with regard to the management computing entity (1102). In a particular embodiment, the user computing entity (1202) may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the user computing entity (1202) may operate in accordance with multiple wired communication standards and protocols, such as those described above with regard to the management computing entity (1102) via a network interface (1216).

Through these communication standards and protocols, the user computing entity (1202) can communicate with various other entities using concepts such as Unstructured Supplementary Service Data (US SD), Short Message Service (SMS), Multimedia Messaging Service (MMS), Dual-Tone Multi-Frequency Signaling (DTMF), and/or Subscriber Identity Module Dialer (SIM dialer). The user computing entity (1202) can also download changes, add-ons, and updates, for instance, to its firmware, software (e.g., including executable instructions, applications, program modules), and operating system.

According to one embodiment, the user computing entity (1202) may include location determining aspects, devices, modules, functionalities, and/or similar words used herein interchangeably. For example, the user computing entity (1202) may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the position of the user computing entity (1202) in connection with a variety of other systems, including cellular towers, Wi-Fi access points, and/or the like. Similarly, the user computing entity (1202) may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smart-phones, laptops), and/or the like. Such technologies may include the iBeacons, Gimbal proximity beacons, Bluetooth Low Energy (BLE) transmitters, NFC transmitters, and/or the like. These indoor positioning aspects can be used in a variety of settings to accurately determine, within inches or centimeters, the location of someone or something.

The user computing entity (1202) may also include a user interface, which can include a display (1212) coupled to a processor (1208) and/or a user input interface coupled to a processor (1208). For example, the user interface may be a user application, browser, user interface, and/or similar words used herein interchangeably executing on and/or accessible via the user computing entity (1202) in order to interact with and/or cause display of information from the management computing entity (1102), as described herein. The user input interface can include any of a number of devices or interfaces allowing the user computing entity (1202) to receive data, such as a keypad (1214) (hard or soft), a touch display, voice/speech or motion interfaces, or other input device. In embodiments including a keypad (1214), the keypad (1214) can include (or cause display of) the conventional numeric (0-9) and related keys (#, *), and other keys used for operating the user computing entity (1202) and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity (1202) can also include volatile storage or memory (1218) and/or non-transitory storage or memory (1220), which can be embedded and/or may be removable. For example, the non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory can store databases, database instances, database management systems, data, applications, programs, program modules, scripts, source code, object code, byte code, compiled code, interpreted code, machine code, executable instructions, and/or the like to implement the functions of the user computing entity (1202). As indicated, this may include a user application that is resident on the entity or accessible through a browser or other user interface for communicating with the management computing entity (1102) and/or various other computing entities.

In another embodiment, the user computing entity (1202) may include one or more components or functionality that are the same or similar to those of the management computing entity (1102), as described in greater detail above. As will be recognized, these architectures and descriptions are provided for exemplary purposes only and are not limiting to the various embodiments.

Exemplary Client Server Environment

Figure 13:
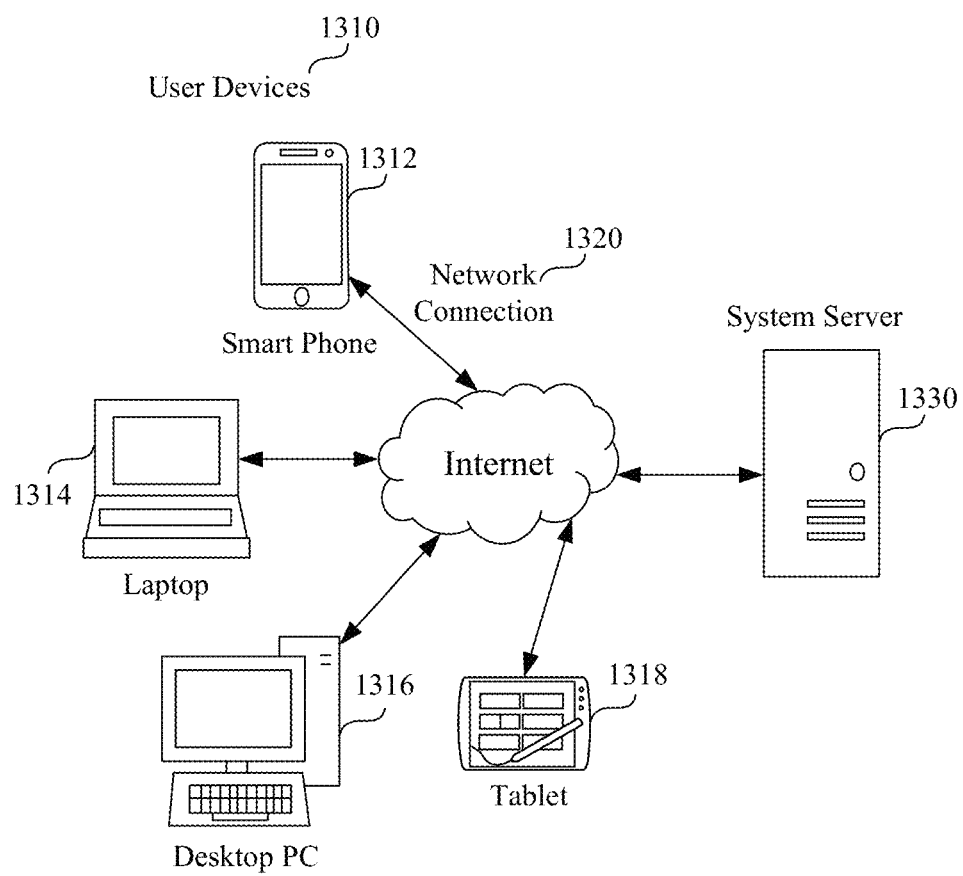
FIG. 13 shows an illustrative system architecture diagram for implementing one embodiment of web-hosted recording in a client-server environment.

The present invention may be implemented in a client server environment. FIG. 13 shows an illustrative system architecture diagram for implementing one embodiment of web-hosted recording in a client-server environment. User devices (i.e., image-capturing device) (1310) on the client side may include smart phones (1312), laptops (1314), desktop PCs (1316), tablets (1318), or other devices. Such user devices (1310) access the service of the system server (1330) through some network connection (1320), such as the Internet.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service) and increases user satisfaction and ease of use. Various business models, revenue models, and delivery mechanisms for the present invention are envisioned, and are all to be considered within the scope of the present invention.

Additional Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back end component, e.g., as an information/data server, or that includes a middleware component, e.g., an application server, or that includes a front end component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In general, the method executed to implement the embodiments of the invention, may be implemented as part of an operating system or a specific application, component, program, object, module or sequence of instructions referred to as "computer program(s)" or "computer code(s)." The computer programs typically include one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually effect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

CONCLUSIONS

One of ordinary skill in the art knows that the use cases, structures, schematics, and flow diagrams may be performed in other orders or combinations, but the inventive concept of the present invention remains without departing from the broader scope of the invention. Every embodiment may be unique, and methods/steps may be either shortened or lengthened, overlapped with the other activities, postponed, delayed, and continued after a time gap, such that every use case and application is accommodated to practice the methods of the present invention.

Although the present invention has been described with reference to specific exemplary embodiments, it will be evident that the various modification and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention.

For simplicity of explanation, the embodiments of the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

In the foregoing description, numerous specific details are set forth, such as specific materials, dimensions, processes, parameters, etc., to provide a thorough understanding of the present invention. The particular features, structures, materials, or characteristics may be combined in any suitable manner in one or more embodiments. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances. Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" in various places throughout this specification are not necessarily all referring to the same embodiment.

What is claimed is:

1. A method, executable by a recording server, for video recording from a third-party website viewed on a user device, comprising:
   receiving, from the user device, an iframe request in response to a user recording request on the third-party website, wherein the third-party website is hosted on a third-party server and enables a user to initiate a recording on the user device, wherein the iframe request comprises a signed token associated with a user access request to the third-party server, and wherein the signed token was received by the user device from the third-party server;
   verifying a signature of the signed token using public key cryptography, wherein the verifying comprises obtaining a key associated with the third-party server from a recording database;
   transmitting an iframe recorder interface code to the user device, in response to the verifying of the signature of the signed token, wherein the iframe recorder interface code comprises program code for generating an iframe for display on the third-party website at the user device;
   receiving, from the iframe on the user device, a session validation request;
   generating a recording session in response to receiving the session validation request by:
      validating the recording session by associating the recording session with the third-party server, and transmitting a validation response to the iframe; and
   receiving, from the iframe on the user device, a recording action request, in response to receiving a recording action to control a recording on the user device.

2. The method of claim 1, wherein the iframe recorder interface code generates a video recorder interface for viewing in the third-party website on the user device.

3. The method of claim 1, further comprising:
   generating a video recording in response to receiving the recording action request.

4. The method of claim 3, further comprising:
   generating a link to a completed recording; and
   transmitting the link to the third-party website for display on the user device.

5. The method of claim 1, wherein the signed token is encrypted using an encryption key that is known only to the recording server.

6. The method of claim 1, wherein the signed token comprises a user session ID and a token validity time.

7. The method of claim 1, wherein the recording action is selected from the group consisting of a starting, a stopping, a previewing, an editing, and a canceling of the recording.

8. The method of claim 1, wherein the recording server is configured for creating a third-party session associated with a guest account upon receiving the iframe request from the user device.

9. The method of claim 8, further comprising:
   generating a recording upon execution of a starting of the recording, wherein the guest account is activated by the execution of the starting of the recording, and wherein the guest account owns the recording.

10. The method of claim 8, further comprising:
    generating a link to a completed recording upon execution of a stopping of the recording, wherein the guest account is deactivated by the execution of the stopping of the recording.

11. A non-transitory storage medium storing program code for video recording from a third-party website viewed on a user device, the program code executable by a hardware processor at a recording server, the program code when executed by the hardware processor causing the hardware processor to:
    receive, from the user device, an iframe request in response to a user recording request on the third-party website, wherein the third-party website is hosted on a third-party server and enables a user to initiate a recording on the user device, wherein the iframe request comprises a signed token associated with a user access request to the third-party server, and wherein the signed token was received by the user device from the third-party server;
    verify a signature of the signed token using public key cryptography, wherein the program code to verify comprises program code to obtain a key associated with the third-party server from a recording database;
    transmit an iframe recorder interface code to the user device, in response to the verifying of the signature of the signed token, wherein the iframe recorder interface code comprises program code for generating an iframe for display on the third-party website at the user device;
    receive, from the iframe on the user device, a session validation request;
    generate a recording session in response to receiving the session validation request by program code to:
       validate the recording session by associating the recording session with the third-party server, and transmit a validation response to the iframe; and
    receive, from the iframe on the user device, a recording action request, in response to receiving a recording action to control a recording on the user device.

12. The non-transitory storage medium of claim 11, wherein the iframe recorder interface code generates a video recorder interface for viewing in the third-party website on the user device.

13. The non-transitory storage medium of claim 11, wherein the program code further comprises program code to generate a video recording in response to receiving the recording action request.

14. The non-transitory storage medium of claim 13, wherein the program code further comprises program code to:
   generate a link to a completed recording; and
   transmit the link to the third-party website for display on the user device.

15. The non-transitory storage medium of claim 11, wherein the signed token is encrypted using an encryption key that is known only to the recording server.

16. The non-transitory storage medium of claim 11, wherein the signed token comprises a user session ID and a token validity time.

17. The non-transitory storage medium of claim 11, wherein the recording action is selected from the group consisting of a starting, a stopping, a previewing, an editing, and a canceling of the recording.

18. The non-transitory storage medium of claim 11, wherein the recording server is configured for creating a third-party session associated with a guest account upon receiving the iframe request from the user device.

19. The non-transitory storage medium of claim 18, wherein the program code further comprises program code to:
   generate a recording upon execution of a starting of the recording, wherein the guest account is activated by the execution of the starting of the recording, and wherein the guest account owns the recording.

20. The non-transitory storage medium of claim 18, wherein the program code further comprises program code to:
   generate a link to a completed recording upon execution of a stopping of the recording, wherein the guest account is deactivated by the execution of the stopping of the recording.

\* \* \* \* \*